(12) United States Patent
Garfinkle et al.

(10) Patent No.: US 11,159,503 B2
(45) Date of Patent: Oct. 26, 2021

(54) AUTHENTICATION FOR COMPUTING SYSTEMS

(71) Applicant: Princeton SciTech, LLC, New York, NY (US)

(72) Inventors: Richard Garfinkle, Chicago, IL (US); Norton Garfinkle, New York, NY (US)

(73) Assignee: Princeton SciTech, LLC, Chicago, IL (US)

( * ) Notice: Subject to any disclaimer, the term of this patent is extended or adjusted under 35 U.S.C. 154(b) by 260 days.

(21) Appl. No.: 15/786,113

(22) Filed: Oct. 17, 2017

(65) Prior Publication Data

US 2019/0116168 A1    Apr. 18, 2019

(51) Int. Cl.
*H04L 29/06*    (2006.01)
*G06F 21/60*    (2013.01)
(Continued)

(52) U.S. Cl.
CPC ............ *H04L 63/08* (2013.01); *G06F 21/552* (2013.01); *G06F 21/606* (2013.01);
(Continued)

(58) Field of Classification Search
CPC . H04L 63/0435; H04L 63/0442; H04L 63/08; H04L 63/083; H04L 63/0869;
(Continued)

(56) References Cited

U.S. PATENT DOCUMENTS 6,061,790 A * 5/2000 Bodnar ................. G06F 21/445
                                                              380/282
9,467,430 B2    10/2016 Smith et al.
(Continued)

FOREIGN PATENT DOCUMENTS

WO    WO 2007/146324    * 12/2007

OTHER PUBLICATIONS

Bhatt Sumeet, Specification of U.S. Appl. No. 62/560,016, filed Sep. 18, 2017. (Year: 2017).*

(Continued)

*Primary Examiner* — Shanto Abedin
*Assistant Examiner* — Adrian Stoica
(74) *Attorney, Agent, or Firm* — Schwegman Lundberg & Woessner, P.A.

(57) ABSTRACT

Various examples are directed to system and methods for authenticating a first computing system and a second computing system. The first computing system may receive second system sending data from the second computing system. The first computing system may generate first composite data based at least in part on the second system sending data and first system receiving data. The first computing system may determine that the first composite data is consistent with first composite reference data. The first computing system may generate first tag data based at least in part on the first composite data and send a request message comprising the first tag data to the second computing system. The first computing system may also receive a reply message comprising second tag data from the second computing system and determine that the second tag data is consistent with reference tag data.

16 Claims, 12 Drawing Sheets

(51) Int. Cl.
*G06F 21/62* (2013.01)
*G06F 21/55* (2013.01)

(52) U.S. Cl.
CPC ...... G06F 21/6209 (2013.01); H04L 63/0442 (2013.01); *G06F 2221/033* (2013.01); *G06F 2221/2101* (2013.01); *G06F 2221/2107* (2013.01)

(58) Field of Classification Search
CPC ...... G06F 21/31; G06F 21/445; G06F 21/552; G06F 21/60; G06F 21/606; G06F 21/62; G06F 21/6209; G06F 21/6218; G06F 2221/033; G06F 2221/2101; G06F 2221/2107

See application file for complete search history.

(56) References Cited

U.S. PATENT DOCUMENTS

| | | |
|---|---|---|
| 2006/0013080 A1 | 1/2006 | Shibata |
| 2007/0097934 A1* | 5/2007 | Walker .............. H04L 9/083 370/338 |
| 2010/0306524 A1 | 12/2010 | Runkis et al. |
| 2013/0095789 A1* | 4/2013 | Keevill ............ H04W 12/0608 455/411 |
| 2015/0113283 A1* | 4/2015 | Corella .............. G06F 21/32 713/185 |
| 2016/0180101 A1* | 6/2016 | Garfinkle ........... G06F 21/62 726/26 |
| 2017/0141920 A1* | 5/2017 | Herder, III ......... H04L 9/3231 |
| 2018/0218137 A1* | 8/2018 | Park ................. G06F 21/45 |
| 2019/0089702 A1* | 3/2019 | Bhatt .............. H04L 63/0884 |

OTHER PUBLICATIONS

Bhatt Summet, Specification of U.S. Appl. No. 62/560,039, filed Sep. 18, 2017 (Year: 2017).*

"European Application Serial No. 18200896.1, Extended European Search Report dated Feb. 11, 2019", 3 pgs.

* cited by examiner

AUTHENTICATION FOR COMPUTING SYSTEMS

TECHNICAL FIELD

Examples described herein generally relate to systems and methods for authenticating computing systems to one another.

BACKGROUND

In network communications, it is important for computing systems to accurately authenticate other computing systems for networked communications. For example, a computing system that cannot accurately authenticate its communication partners is vulnerable to various attacks including, for example, man-in-the-middle attacks, spoofing attacks, phishing attacks, etc. A computing system, then, seeks to have its communication partner provide a verifiable answer to the question, "who are you?"

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
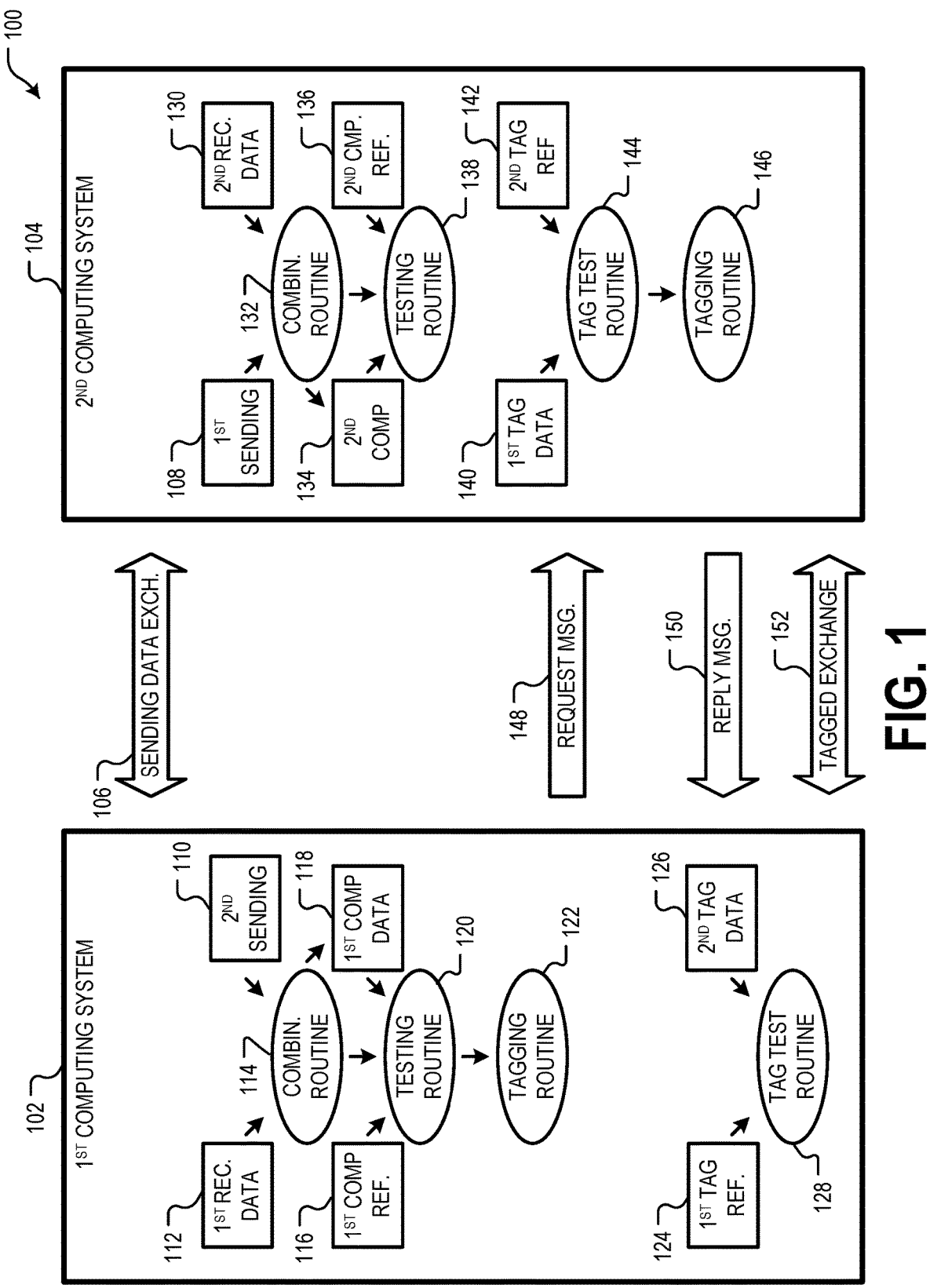
FIG. 1 is a diagram showing one example of an environment for authenticating computing systems.

In the following description, for purposes of explanation, numerous specific details are set forth in order to provide a thorough understanding of some examples. It will be evident, however, to one skilled in the art that the present disclosure may be practiced without these specific details.

In various examples, two computing systems authenticate to one another when a first computing system provides identification information to the second computing system. The identification information may include, for example, a user name, a password, biometric data, etc. The second computing system stores or has access to a previously-generated reference copy of the identification information. If the identification information provided by the first computing system is consistent with the reference identification information, then the first computing system is authenticated to the second computing system.

Techniques that use identification information in this manner, however, may be vulnerable to various different attacks. For example, in a phishing attack, an attacker system steals identification information from the first computing system by pretending to be the second computing system. The first computing system erroneously provides its identification information to the attacker system. The attacker system (or another system) then uses the stolen identification information to pose as the first computing system and gain access to the second computing system. This may allow the attacker system to gain access to sensitive data and/or functionality at the second computing system.

To address these (and other) vulnerabilities, various examples herein include authentication that utilizes information and/or routines that are stored at both the first computing system and the second computing system. For example, each computing system may include sending data and receiving data. Initially, the first computing system and the second computing system exchange sending data. For example, the first computing system provides first sending data to the second computing system and the second computing system provides second sending data to the first computing system.

The first computing system may execute a combining routine to generate first composite data from a combination of its own first receiving data and the second sending data received from the second computing system. The first computing system may execute a testing routine to verify the first composite data, for example, by comparing it to first composite reference data. If the first computing system does not (or cannot) verify the first composite data, the first computing system may abort the authentication. If the first composite data is verified, the first computing system may execute a tagging routine to generate first tag data from the first composite data. For example, the first tag data may include all or part of the first composite data. The first computing system may include the first tag data in a request message that the first computing system sends to the second computing system.

The second computing system may also execute a combining routine to generate second composite data from a combination of its own second receiving data and the first sending data received from the first computing system. The second computing system also executes a testing routine to verify the second composite data, for example, by comparing it to second composite reference data. If the second composite data is not verified, the second computing system may abort the authentication. For example, if the second composite data is not verified, the second computing system may decline and/or discard the request message from the first computing system.

If the second composite data is verified, the second computing system may proceed, for example, by processing the request message sent by the first computing system. The second computing system may execute a tag check routine to verify the first tag data, for example, by comparing it to second tag reference data. If the first tag data is not verified, then the second computing system may abort the authentication. If the first tag data is verified, then the second computing system may executing a tagging routine to generate second tag data from the second composite data. For example, the second tag data may include all or part of the second composite data. The second computing system may generate a reply message including the second tag data and send the reply message to the first computing system.

The first computing system may receive the tag message and execute a tag test routine to verify the second tag data, for example, by comparing it to first tag reference data. If the second tag data is not verified, the first computing system may abort the authentication. If the second tag data is verified, the authentication may be complete.

Various examples may utilize different forms of sending data, receiving data, and relevant routines. In one example, the sending data includes identification information. For example, the first computing system may generate the first sending data by encrypting identification information with a public key of the second party. The receiving data may include the corresponding private keys of the two computing systems. For example, the second computing system combining routine may be programmed to decrypt the encrypted identification information (e.g., first sending data) with the second system's private key (e.g., second receiving data) to generate clear identification information (e.g., second composite data).

In another example, the sending data includes image files. For example, the first computing system may exchange images. Composite data may be found by masking one image with another. For example, the second computing system combining routine may use a first image (e.g., first sending data) using a second image (e.g., second receiving data) to generate a masked image file (e.g., second composite data).

In yet another example, sending data includes one or more disassembled data structures, or components thereof. Composite data may be found by re-assembling the disassembled data structures. For example, the second computing system combining routine may generate a reassembled data structure (e.g., second composite data) from first partial disassembled data comprising a first portion of a disassembled data structure (e.g., first sending data) and second partial dissembled data comprising a second portion of the disassembled data structure (e.g., second receiving data).

In the example authentications described herein, each party to the authentication confirms that the other party has authentic public data (e.g., the sending data) and authentic private data (e.g., the receiving data). Because of this, it may not be very difficult for an attacker to steal the transmitted data and then use that transmitted data to later impersonate one of the computing systems. For example, consider a case where an attacker system has a stolen copy of the first sending data from the first computing system. The attacker system can attempt to impersonate the first computing system to the second computing system. The impersonation attempt will most likely fail, however, because the attacker system lacks the first receiving data and, therefore, cannot generate the first composite data in order to derive the first tag data.

FIG. 1 is a diagram showing one example of an environment 100 for authenticating computing systems. The environment includes a first computing system 102 and a second computing system 104. The first computing system 102 and second computing system 104 may be or include any suitable computing device or devices. For example, the first computing system 102 may be or include a server, a desktop computing device, a laptop computing device, a tablet computing device, a mobile telephone device, a network of computing devices, etc. Similarly, the second computing system 104 may be or include a server, a desktop computing device, a laptop computing device, a tablet computing device, a mobile telephone device, a network of computing devices, etc.

In some examples, the first computing system 102 seeks access to the second computing system 104. For example, the first computing system 102 may be or include a user computing device and the second computing system 104 may be a service provider system, such as an Internet merchant, a financial services system, an insurance provider system, etc.

Initially, the first computing system 102 and the second computing system 104 may exchange respecting sending data 108, 110 via a sending data exchange 106. The sending data exchange 106 may occur in any suitable manner. In some examples, the first computing system 102 initially sends its first sending data 108 to the second computing system 104, which may respond by providing its second sending data 110 to the first computing system 102. In other examples, the second computing system 104 may first provide its second sending data 110 to the first computing system 102, which may reply by providing its first sending data 108 to the second computing system 104. In some examples, the computing system 102, 104 that first receives the other computing systems sending data first may verify that sending data before providing its own sending data. For example, if first computing system 102 provides its first sending data 108 to the second computing system 104, the second computing system 104 may verify the first sending data before providing its second sending data 110 to the first computing system 102.

Referring now to the first computing system 102, it may execute a combining routine 114 to generate first composite data 118 from the second sending data 110 (received from the second computing system 104). The combining routine 114, for example, may be stored at the first computing system 102. The first composite data 118 may be a result of the combining routine 114.

Upon generating the first composite data 118, the first computing system 102 may execute a testing routine to verify the first composite data 118. For example, the testing routine may receive the first composite data 118 and first composite reference data 116. The first composite reference data 116 may be stored at the first computing system 102 and may indicate an expected value and/or expected property of the first composite data 118.

The testing routine 120 may determine whether the first composite data 118 is consistent with the first composite reference data 116. Pieces of data may be consistent with one another in various ways. In some examples, a first piece of data (Data A) is consistent with a second piece of data (Data B) if all or part of Data A is identical to all or part of Data B. In other examples, Data A is consistent with Data B if all or a portion of Data A describes or identifies Data B (or if all or part of Data B describes or identifies all or part of Data A). For example, Data A may include a hash or other property of Data B.

In some examples, the first composite reference data 116 includes a complete copy of what the first composite data 118 is expected to be (e.g., if correct). The first composite data 118 may be consistent with the first composite reference data if all or part of the first composite data 118 is equivalent to all or part of the first composite reference data 116. In other examples, the first composite reference data 116 may include a hash or other coding of what the first composite reference data is expected to be. The first composite data 118 may be consistent with the first composite reference data 116 if a hash or other coding of the first composite data 118 is equivalent to the hash or other coding indicated by the first composite reference data 116. If the first composite reference data is not verified, the first computing system 102 may abort the authentication.

If the composite reference data 118 is verified, it may indicate to the first computing system 102 that the second computing system 104 possesses a valid version of the second receiving data. The first computing system 102 may execute a tagging routine 122 to generate first tag data 140 to be included with a request message 148. The first tag data 140 may be based on the first composite data 118. For example, the first tag data 140 may include some or all of the first composite data, a property or properties of the first composite data, a hash or other coding of the first composite data, etc. The first computing system may send the request message 148, including first tag data 140, to the second computing system 104.

Referring now to the second computing system 104, it may execute a combining routine 132 to generate second composite data 134 from the first sending data (received from the first computing system 102) and second receiving data 130 of the second computing system. The combining routine 132 may operate in a manner similar to that of the combining routine 114. In some examples, the combining routine 132 may be equivalent to the combining routine 114 (e.g., executed from the same code). A testing routine 138 may verify the second composite data, for example, by comparing it to second composite reference data 136 in a manner similar to that described with respect to the testing routine 120. The second composite reference data 136 may be stored at the second computing system 104. If the second composite data 134 is not verified, the second computing system 104 may abort the authentication.

If the second composite reference data 134 is verified, the second computing system 104 may receive and/or process the request message 148 from the first computing system 102. For example, the second computing system 104 may execute a tag test routine 144. The tag testing routine 144 may receive as input the first tag data 140 from the request message 148 and also second tag reference data 142. The second tag reference data 142 may be stored at the second computing device 104 and may indicate an expected value and/or expected property of the first tag data 140.

The tag test routine 144 may determine whether the first tag data 140 is consistent with the second tag reference data 142. In some examples, the second tag reference data 142 includes a complete copy of what the first tag data 140 is expected to be (e.g., if correct). The first tag data 140 may be consistent with the second tag reference data 142 if all or part of the first tag data 140 is equivalent to all or part of the first tag data 140. In other examples, the second tag reference data 142 includes a hash or other coding of what the first tag data 140 is expected to be. The first tag data 140 may be consistent with the second tag reference data 142 if a hash or coding of the first tag data 140 is equivalent to the hash or other coding indicated by the second tag reference data 142. If the first tag data 140 is not verified, the second computing system 104 may abort the authentication.

If the second computing system 104 does verify the first tag data 140, it may execute a tagging routine 146 to generate second tag data 126. The second computing system 104 combines the second tag data 126 with a reply message 150 and sends the reply message 150 to the first computing system. The first computing system 102, in response, may execute a tag test routine 128 that may operate, for example, as described with respect to the tag test routine 144, to verify the second tag data 126, for example, by determining whether the second tag data 126 is consistent with first tag reference data 124.

If the first computing system 102 verifies the second tag data 126, the authentication may be complete. For example, the first computing system 102 may subsequently access data and/or functionality of the second computing system 104 and/or the second computing system 104 may access data and/or functionality of the first computing system 102.

In some examples, the first computing system 102 and second computing system 104 may engage in a tagged exchange 152. For example, the first computing system 102 may execute the tagging routine 122 to derive subsequent instances of tag data to be used with subsequent messages to the second computing system. For example, instances of tag data for different messages to the second computing system 104 may be different. The second computing system 104, upon receiving subsequent messages, may verify the subsequent instances of tag data, for example, by executing the tag test routine 144. The tag test routine 144 may compare the subsequent instances of tag data to tag reference data stored at the second computing system 104. Similarly, the second computing system 104 may execute the tagging routine 146 to generate subsequent instances of tag data for messages sent to the first computing system 102. The first computing system 102 may execute the tag test routine 128 to verify the subsequent instances of tag data from the second computing system 104.

When implemented, the tagged exchange 152 may allow the computing systems 102, 104 to continually renew the authentication performed as described herein. For example, if an attacker were to steal one party's sending data and initial tag data (e.g., tag data 140, 126), it may be possible to spoof one side of the initial authentication shown in FIG. 1. In some examples, possession of the sending data and initial tag data may not allow the attacker to generate subsequent tag data, for example, without possession of the relevant composite data, which is not transferred between the computing systems 102, 104.

Figure 2:
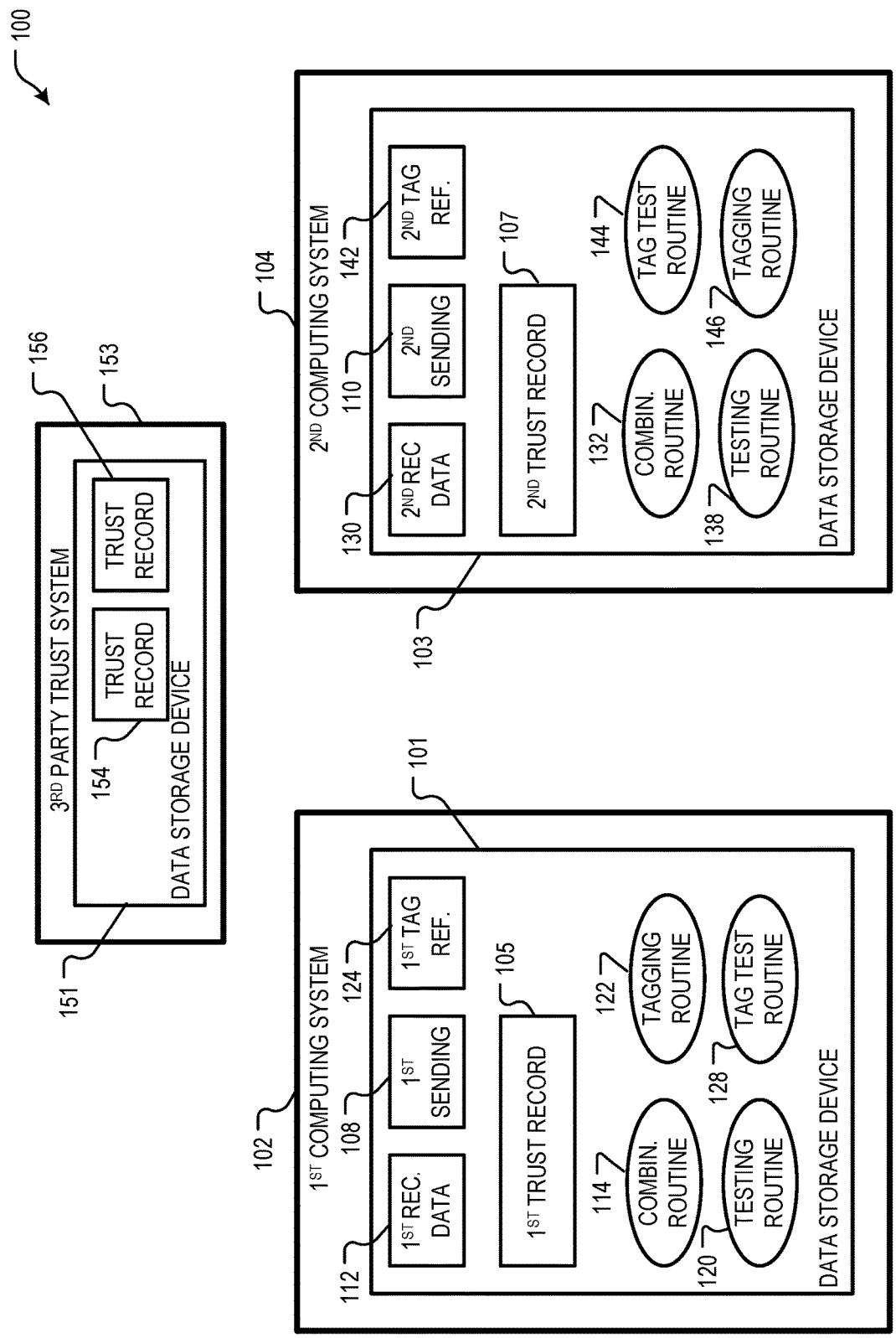
FIG. 2 is a diagram showing another example of the environment of FIG. 1.

FIG. 2 is a diagram showing another example of the environment 100 of FIG. 1. FIG. 2 shows the first computing system 102 with a data storage device 101 that stores the first receiving data 112, the first sending data 108, and the first tag reference data 124. The data storage device 101 also includes the combining routine 114, the tagging routine 122, the testing routine 120 and the tag test routine 128. For example, the data storage device 101 may include instructions that, when executed by a processor unit, cause the processor unit to implement the routines 114, 120, 122, 128 as described herein.

The second computing system 104 also includes a data storage device 103 that stores the second receiving data 130, the second sending data 110, and the second tag reference data 142. The data storage device 103 may also store instructions for executing the combining routine 132, the testing routine 138, the tag test routine 144, and the tagging routine 146. The data storage devices 101, 103 may include one or more devices for storing data including, for example, solid state devices, disk drives, etc.

The example of the environment 100 shown in FIG. 2 also demonstrates an optional trust record feature. For example, the first computing system 102 may store a first trust record 105. The first trust record 105 may include an indication of how trustworthy the second computing system 104 has been in past interactions with the first computing system 102. For example, When the first computing system 102 receives a verified message (e.g., a tagged message with a verified tag), the first computing system 102 may tally the message. If the first computing system receives a message from the second computing system 104 that is not properly tagged, it may also store this data at the first trust record 105. The first computing system 102 may determine a level of trust for the second computing device 104 based on the verified and unverified messages. In some examples, the second computing system 104 generates a similar second trust record 107 that includes data describing verified and/or unverified messages received from the first computing system. The second computing device 104 may similarly determine an indication of the trustworthiness of the first computing system 102.

Optionally, the environment 100 includes a third party trust system 153. The third party trust system 153 may include a data storage device 151 including trust records 154, 156. For example, the third party trust system 153 may monitor successful authentications made by the first computing system 102 and/or the second computing system 104. For example, the first computing system 102 and/or the second computing system 104 may report to the third party trust system 153 the successful or unsuccessful completion of an authentication (e.g., as described with respect to FIG. 1) and/or the successful or unsuccessful verification of a tagged message. The third party trust system 153 may determine a trustworthiness of the first computing system 102 and/or the second computing system 104. When a third computing system is to authenticate with the first computing system 102 or the second computing system 104, it may communicate with the third party trust system 153 to obtain an indication of the trustworthiness of the first computing system 102 and/or the second computing system 104.

Figure 3:
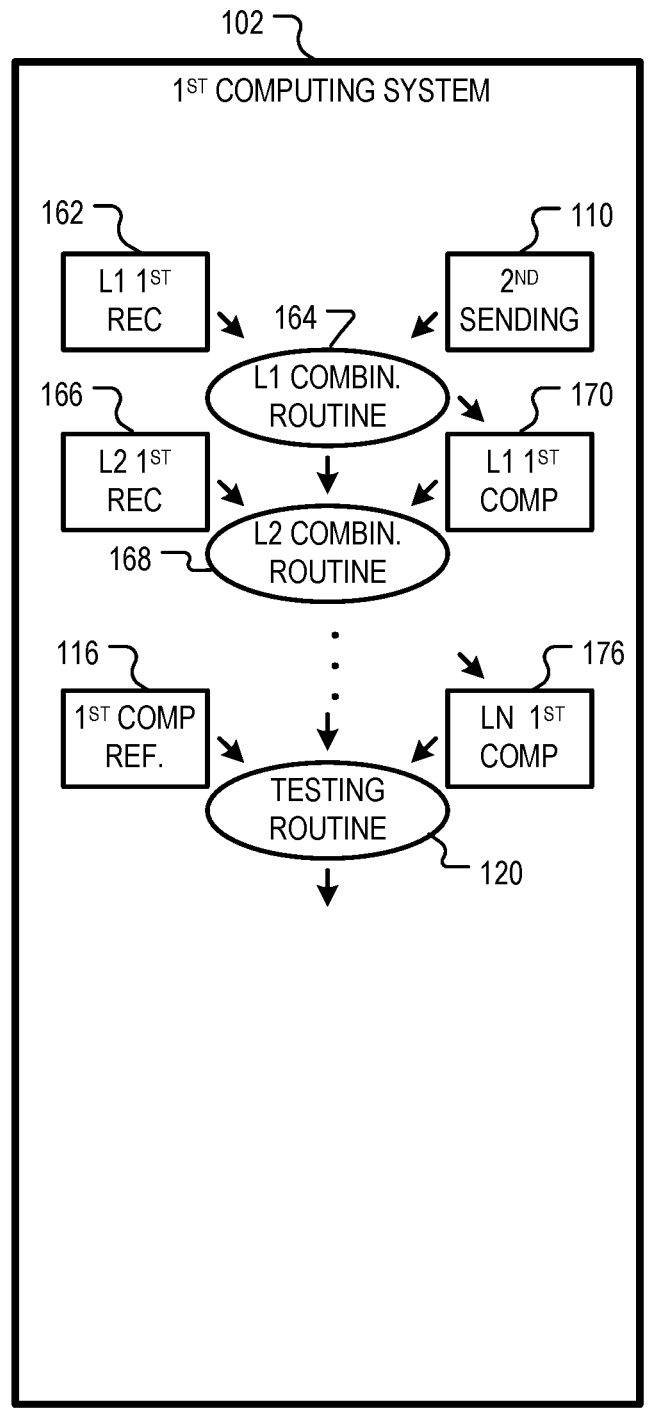
FIG. 3 shows one example of the first computing system of FIGS. 1 and 2 implementing a nested combining routine utilizing multiple levels of combing routines.

In some examples, the first computing system 102 and/or the second computing system 104 utilizes a nested combining routine. For example, FIG. 3 shows one example of the first computing system 102 implementing a nested combining routine utilizing multiple levels of combing routines 164, 168. A first level (L1) combining routine may combine the second sending data 110 with L1 first receiving data 162 to generate L1 first composite data 170. A second level (L2) combining routine 168 may combine the L1 first composite data 170 and additional receiving data (e.g., L2 first receiving data 166) to generate additional composite data. Although two levels are shown in FIG. 1, any suitable number of levels may be used. The testing routine 120 may receive the $N^{th}$ level (LN) first composite data 176, wherein N is the total number of levels. The testing routine 120 may verify the LN first composite data, for example, with additional first composite reference data 116 (e.g., Nth first composite reference data). Although FIG. 3 shows the first computing system 102, in various examples, the second computing system 104 may also utilize a similar nested combining routine.

Figure 4:
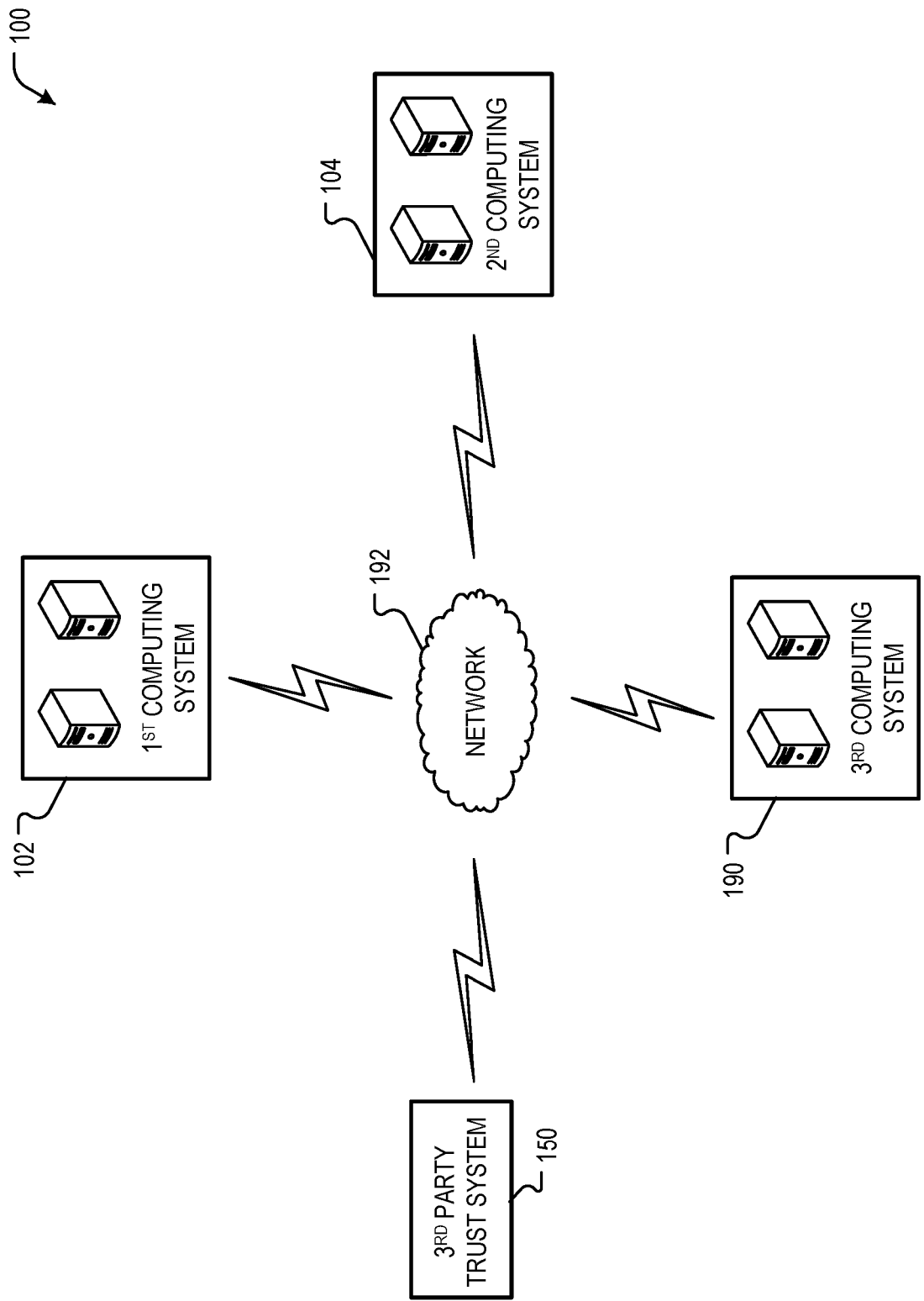
FIG. 4 is a diagram showing another example of the environment showing additional details.

FIG. 4 is a diagram showing another example of the environment 100 showing additional details. For example, FIG. 4 shows an example third computing system 190 that may operate in a manner similar to that described herein with respect to the first computing system 102 and/or the second computing system 104. For example, the third computing system 190 may authenticate as described herein with the first computing system 102 and/or the second computing system 104. FIG. 4 also shows the optional third party trust system 153 of FIG. 2.

The various components of the environment 100 may be in communication with one another via a network 192. The network 192 may be or comprise any suitable network element operated according to any suitable network protocol. For example, one or more portions of network 192 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 5:
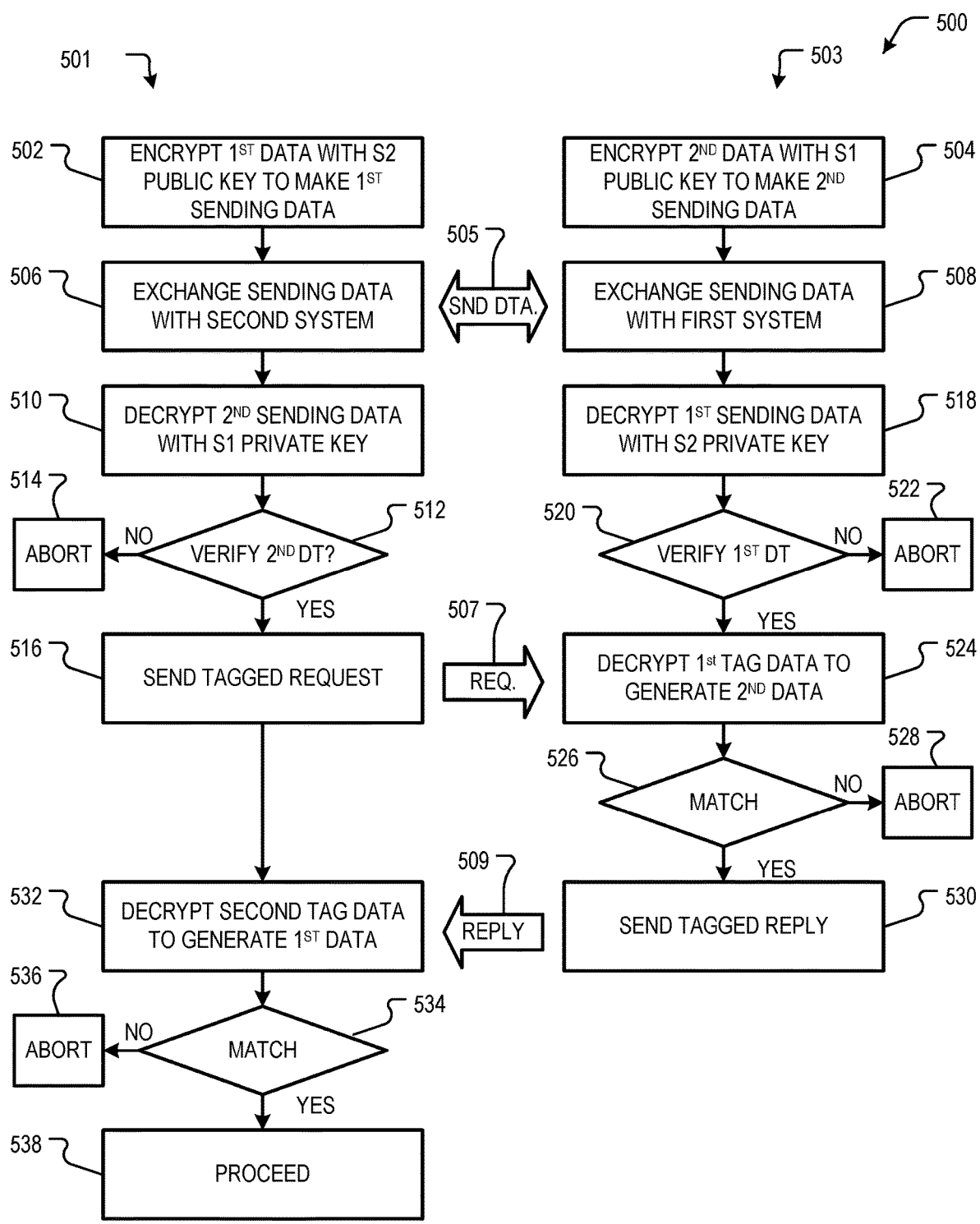
FIG. 5 is a flowchart showing one example of a process flow that may be executed by a first computing system and a second computing system to authenticate, for example, utilizing public and private keys.

As described herein, various different types of sending data, receiving data, and combining routines may be used to implement the systems and methods described herein. FIG. 5 is a flowchart showing one example of a process flow 500 that may be executed by a first computing system (such as 102) and a second computing system (such as 104) to authenticate, for example, utilizing public and private keys. In the example of FIG. 5, the first computing system 102 may have a first computing system public key and a first computing system private key. The second computing system 104 may have a second computing system public key and a second computing system private key. The public keys may be shared, whereas the private keys are now shared.

FIG. 5 includes two columns 501, 503. Column 501 includes actions performed by the first computing system while the column 503 includes actions performed by the second computing system. At operation 502, the first computing system may generate its first sending data by encrypting first system data with the public key of the second computing system 104. The first system data may be any suitable data, such as a user name, a password, biometric data, etc., or some combination thereof. At operation 504, the second computing system may similarly generate its own second sending data, for example, by encrypting second system data with the public key of the first computing system. The second system data may also be, for example, a user name, a password, biometric data, etc. or some combination thereof.

At operations 506 and 508, the first and second computing systems exchange sending data. For example, the systems may exchange one or more messages 505 including sending data. At operation 510, the first computing system may execute its combining routine to generate first composite data. For example, the first computing system may decrypt the second sending data with its own private key (e.g., the first system private key). In this operation, the first receiving data may include the first system private key. The first composite data may include the resulting second system data (e.g., clear version of the second sending data).

At operation 512, the first computing system may execute its testing routine to verify the first composite data. In the example of FIG. 5, the testing routine may verify the first composite data by comparing the first composite data (e.g., the clear second system data) with first composite reference data. If the clear second system data is consistent with the first composite reference data, then the first composite data may be verified. If the first composite data is not verified, the first computing device may abort the process flow 500 at operation 514 (e.g., by not performing further operations with the second computing system). If the first composite data is verified, the first computing device may, at operation 516, send a tagged request message 507 to the second computing system. The tagged request message 507 may include first tag data that is determined, by the tagging routine of the first computing system based at least in part on the first composite data. In some examples, the first computing system generates the tag data by encrypting all or part of the clear second system data with the second system public key.

Referring now back to the second computing system, at operation 518, it may execute its combining routine to generate second composite data. Similar to the first computing system, the combining routine of the second computing system combining routine may decrypt the first second system data with its own private key (e.g., the second system private key). The second receiving data, may include the second system private key. The second composite data may include the clear version of the first system data that results from decrypting the first sending data.

At operation 520, the second computing system may execute its testing routine to verify the second composite data. This may include, for example, comparing the second composite data (e.g., the clear first system data) with second composite reference data. If the clear first system data is consistent with the second composite reference data, then the second composite data may be verified. If the second composite data is not verified, the second computing device may abort the process flow at operation 522.

If the second composite data is verified, the second computing device may, at operation 524, execute its tag test routine to test the first tag data. The tag test routine may also include determining, at operation 526, if the first tag data is consistent with the second tag reference data. In this example, that may include comparing the decrypted tag data to all or part of the second system data. If the decrypted tag data is not consistent with the second system data, the second computing system may abort the authentication at operation 528. If the decrypted tag data is consistent with the second system data, then the second computing system may, at operation 530, send a reply message 509 to the first computing system. For example, the second computing system may generate second tag data by encrypting the clear first system data with the first system public key.

The first computing device may receive the reply message 509 at operation 532 and execute its tag test routine. Executing the tag test routine may include decrypting the second tag data with the first system private key, at operation 532, and comparing the result to the first tag reference data (e.g., the first system data) at operation 534. If the result is consistent with the first tag reference data, the first computing system may abort the authentication at operation 536. If the result is not consistent with the first tag reference data, the first computing system may proceed with its communication with the second computing system at operation 538.

In some examples, sending data and receiving data may include image data. A combining routine may combine images by "masking" one image with another. For example, image data may include a matrix of pixel values. Masking may include aligning a first matrix of pixel values from first image data with a second matrix of pixel values from second image data. A masked image may be generated by performing one or more masking operations on aligned pixels. Examples of masking operations include substituting pixel values from one set of image data into another, performing a mathematical operation on aligned pixel values, etc. Also, in some examples, operations may not be limited to a single pixel position. For example, a masking operation may replace one pixel value with an average, sum, product, or other mathematical operation performed on a set of pixel values surrounding the single pixel position.

Figure 6:
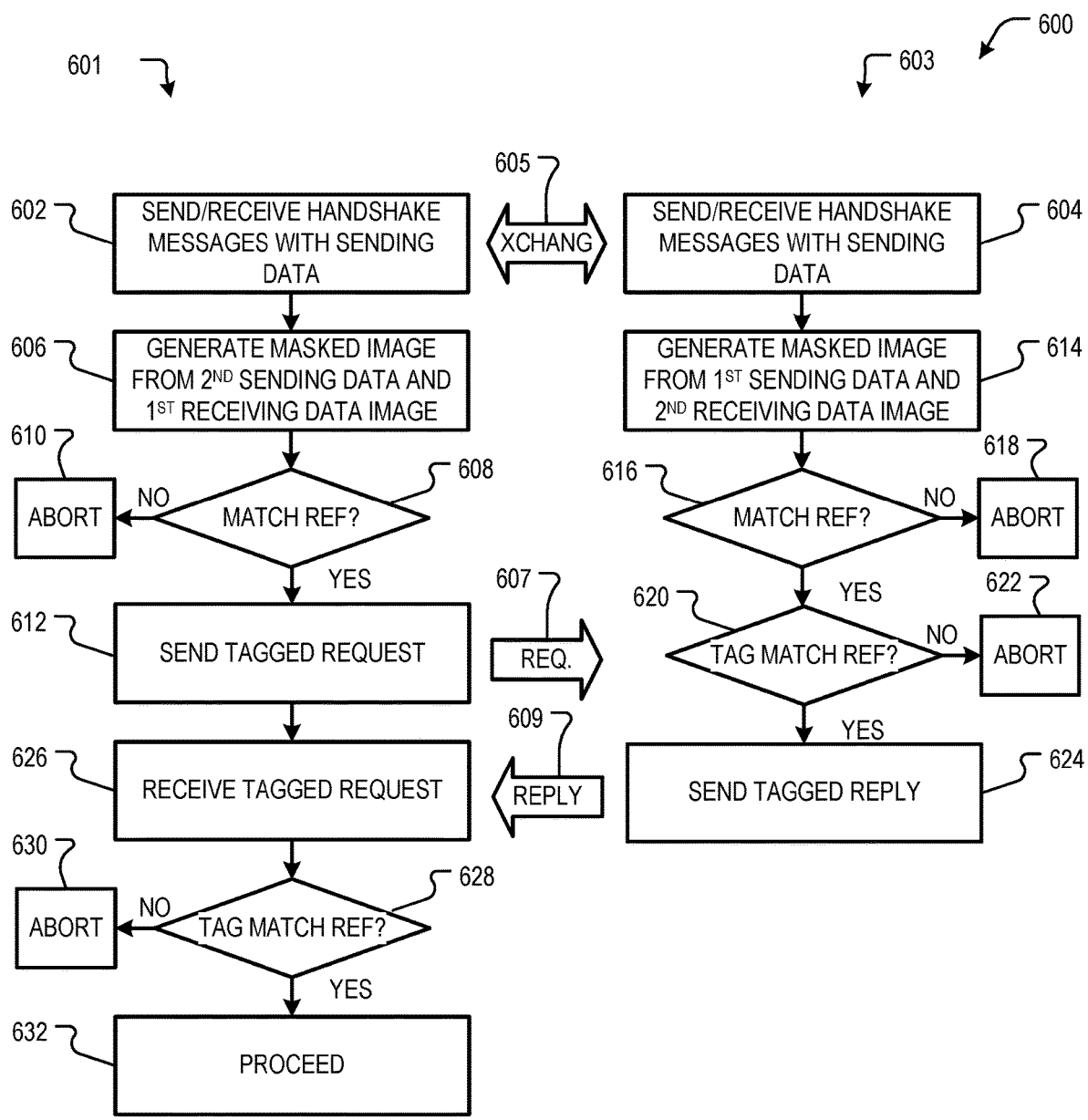
FIG. 6 is flowchart showing one example of a process flow that may be executed by a first computing system and a second computing system to authenticate, for example, utilizing image data.

FIG. 6 is flowchart showing one example of a process flow 600 that may be executed by a first computing system (such as 102) and a second computing system (such as 104) to authenticate, for example, utilizing image data. FIG. 6 includes two columns 601, 603. Column 601 includes actions performed by the first computing system 102 while the column 603 includes actions performed by the second computing system 104.

At operations 602 and 604, the first and second computing systems exchange sending data. For example, the systems may exchange one or more messages 605 including sending data. First sending data of the first computing system may include first sending image data. The first sending image data may be receive, captured, or derived in any suitable manner. For example, the first computing system may utilize a camera to capture first source image data. The first sending image data may be based on the first source image data. For example, the first sending image data may include all or part of the first source image data. Similarly, the second sending data may include second sending image data. The second sending image data may be based at least in part on second source image data.

At operation 606, the first computing system may execute its combining routine to generate first composite data. For example, the combining routine may combine the second sending image data from the second sending data with the first receiving data. The first receiving data may include first receiving image data. Combining the second sending image data with receiving image data may include masking the second sending image data and the receiving image data. The first composite data may include first masked image data.

At operation 608, the first computing system may execute its testing routine to verify the first composite data. In the example of FIG. 6, the testing routine may verify the first composite data by comparing the first masked image data to the first composite reference data. The first composite reference data may include, for example, expected pixel values for all or a portion of the first masked image data and/or other expected parameters of the first masked image data such as, for example, mean or median color value, brightness, pixel value, etc. of all or part of the first masked image data.

If the masked image is consistent with the first composite reference data, then the first composite data may be verified. If the first composite data is not verified, the first computing device may abort the process flow 600 at operation 610. If the first composite data is verified, the first computing device may, at operation 612, send a tagged request message 607 to the second computing system. The tagged request message 607 may include first tag data that is determined, by the tagging routine of the first computing system based at least in part on the first composite data. For example, the first tag data may include some or all of the first composite data (e.g., the first masked image data), parameters of the first composite data (e.g., mean or median color value, brightness, pixel value, etc. of all or part of the first masked image data), or any other suitable value based on the first masked image data.

Referring now back to the second computing system, at operation 614, it may execute its combining routine to generate second composite data. Similar to the first computing system, the combining routine of the second computing system combining routine may mask the first sending image data with second receiving image data of the second computing system to generate second masked image data. The second masked image data may make up some or all of the second composite data.

At operation 616, the second computing system may execute its testing routine to verify the second composite data. This may include, for example, comparing the second composite data (e.g., the second masked image data) with second composite reference data. If the second masked image data is consistent with the second composite reference data, the second composite data may be verified. If the second composite data is not verified, the second computing device may abort the process flow at operation 618.

If the second composite data is verified, the second computing device may, at operation 620, execute its tag test routine to test the first tag data received from the first computing system with the request message 607. If the first tag data is not consistent with second tag reference data, the second computing system may abort the process flow 600 at operation 622. If the first tag data is consistent with the second tag reference data, the second computing system may, at operation 630, send a reply message 609 to the first computing system at operation 624. The reply message 609 may include second tag data that may be determined, for example, in manner similar to that described above with respect to the first tag data.

The first computing device may receive the reply message 609 at operation 626 and execute its tag test routine, for example, by comparing the second tag data to first tag reference data. If the second tag data is not consistent with the first tag reference data at operation 628, the first computing system may abort the authentication at operation 630. If the second tag data is consistent with the first tag reference data, the first computing system may proceed with its communication with the second computing system at operation 632.

In some examples, combining of sending and receiving data to perform the authentication described herein may include re-assembling data structures that were previously disassembled. Example systems and methods disassembling and reassembling data structures is provided in co-owned U.S. patent application Ser. No. 14/574,039 entitled "DATA SECURITY UTILIZING DISASSEMBLED DATA STRUCTURES," filed on Dec. 17, 2014 and incorporated by reference herein in its entirety. Also, example data assembly and disassembly techniques that may be used for authentication are described with respect to FIGS. 7-9.

Figure 7:
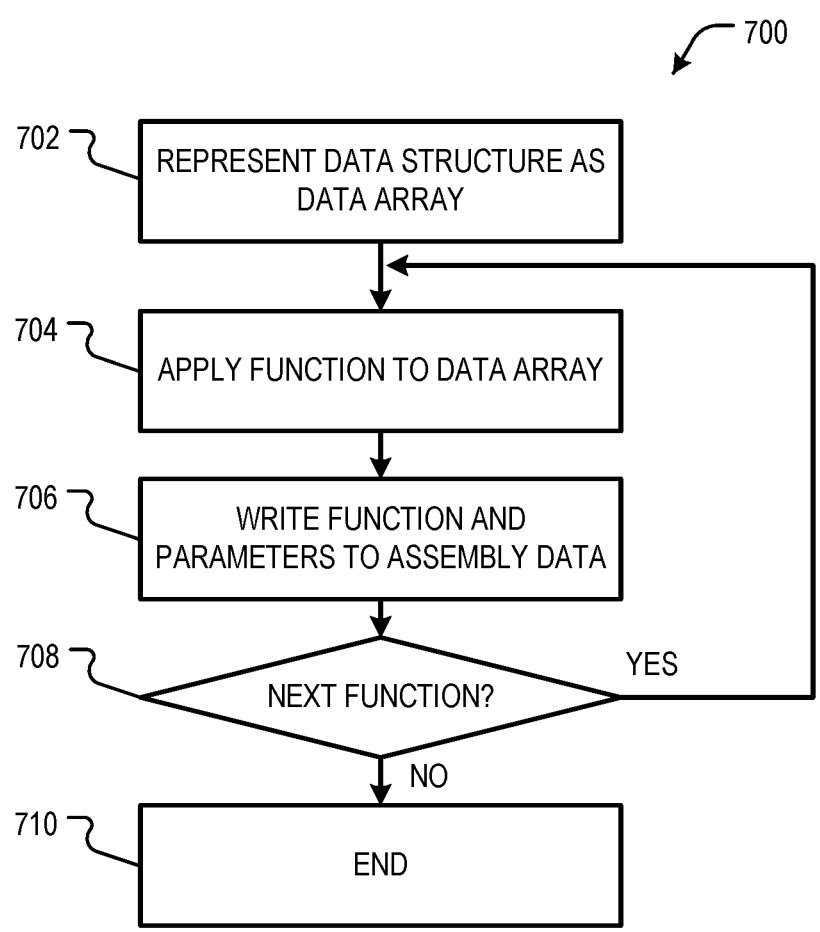
FIG. 7 is a flowchart showing one example of a process flow that may be executed to disassemble a data structure, such as a data resource or access object.

FIG. 7 is a flowchart showing one example of a process flow 700 that may be executed (e.g., by a data disassembler) to disassemble a data structure, such as a data resource or access object. The process flow 700 may be executed by any suitable data disassembler such as, for example, the first computing system, the second computing system, a third party computing system, etc. At operation 702, the data disassembler may represent a data structure (e.g., an assembled data resource or access object) as a multi-dimensional array. For example, the data structure may include data units (e.g., bytes, bits, file system data blocks, etc.) each data unit each data unit making up the data structure may be described by a unique coordinate set. Coordinate sets may be represented according to any suitable coordinate format including, for example, rectangular or Cartesian coordinates, polar coordinates, cylindrical coordinates, spherical coordinates, etc. If the data structure is received in a format that is already expressed as a multi-dimensional array, operation 702 may be omitted. The multidimensional array may be a two-dimensional rectangular array in which the data units of the data structure are described by a set of two (2) coordinates. In rectangular format, the coordinates for each data unit in the multi-dimensional array may be described as (i) a position on a horizontal or x-axis; and (ii) a position on a vertical or y-axis. Of course, in some examples, the multi-dimensional array may include more than two dimensions.

At operation 704, the data disassembler may apply a first function from an ordered set of functions to the data array. The function may be any type of function that takes one or more input parameters or function parameters and provides as output an ordered series of coordinate sets. Function parameters for a function may include, for example, an offset or offsets for the function, a range over which the function is to be applied, coefficients or other function variations, etc. Data units from the multi-dimensional array at the positions of the ordered series of coordinate sets may be written in order to disassemble data. At the multi-dimensional array, the previous location of moved data units may be left blank or filled with a replacement data (e.g., a null indicator, a predetermined value, etc.). The disassembled data may comprise any one or more logical data containers such as, for example, one or more files, one or more sub-files, one or more directories, etc.

At operation 706, the data disassembler may write the first function and its function parameters to assembly data, which may comprise an ordered list of functions and function parameters used in the disassembly. In this way, the data disassembler may create a record of the functions applied to the multi-dimensional array, the function parameters used, and the order in which the functions were applied. The assembly data may be used in conjunction with the disassembled data and the remnant array of the data array to reassemble the data structure, as described herein. The assembly data may comprise any one or more logical data containers such as, for example, one or more files, one or more sub-files, one or more directories, etc. In examples where the ordered set of functions and associated function parameters is created before data disassembly, operation 706 may be omitted. At operation 708, the data disassembler may determine whether there is a next function in the ordered set of functions that has yet to be applied to the data structure. The next function may be a function immediately after the first function according to the ordered set of functions. If there is no next function, the data disassembler may conclude at operation 710. If there is a next function, the data disassembler may return to operation 704 and apply the next function as described.

In some examples, the data disassembler may generate the ordered set of functions during the disassembly process. Accordingly, determining whether there is a next function may comprise determining whether a threshold number of functions have been applied to the multi-dimensional array. If the threshold has been met, then the data disassembler may conclude. If the threshold has not been met, then the data disassembler may select a next function in any suitable manner. For example, the data disassembler may randomly select the next function from a prepopulated list of functions.

Figure 8:
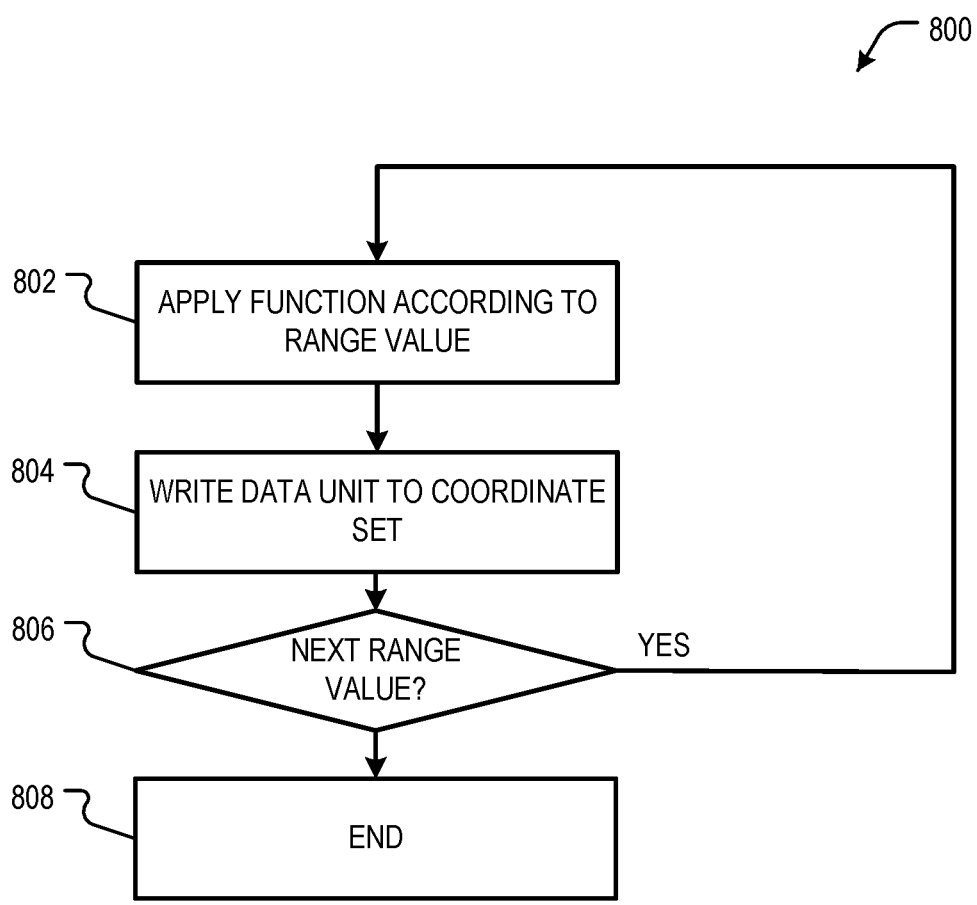
FIG. 8 is a flowchart showing one example of a process flow that may be executed to apply a function to the multi-dimensional array, for example, as described at action.

FIG. 8 is a flowchart showing one example of a process flow 800 that may be executed by the data disassembler to apply a function to the multi-dimensional array. For example, the process flow 800 shows one example way that the data disassembler may apply a function to the multi-dimensional array, as described above with respect to operation 704. At operation 802, the data disassembler may apply a function according to a first range value. As described herein, each function may be applied with function parameters that include a range over which the function is to be applied to the multi-dimensional array. The range may be expressed in any suitable form. For example, when the function is a parametric equation, the range may be expressed as an ordered set of values for the parameter. Also, in some examples, the range may be expressed as an ordered set of values along one or more of the coordinate axes of the multi-dimensional array.

The first range value, applied to the function, may provide a set of coordinates from the multi-dimensional array. At operation 804, the data disassembler may write the data unit at the provided coordinates to the disassembled data. Data units may be written to the disassembled data in order. For example, at operation 804, the data unit may be written to the disassembled data at a position immediately after a position of the previous data unit written to the disassembled data. The data disassembler may replace the data unit in the multi-dimensional array with replacement data, for example, as described above. At operation 806, the data disassembler may determine whether there is a next range value for the function (e.g., whether the data disassembler has already applied the function over the entirety of the indicated range). If there is a next range value, the data disassembler may return to operation 802 and apply the function according to the next range value. If there is no next range value for the function, application of the function may be completed at operation 808.

Figure 9:
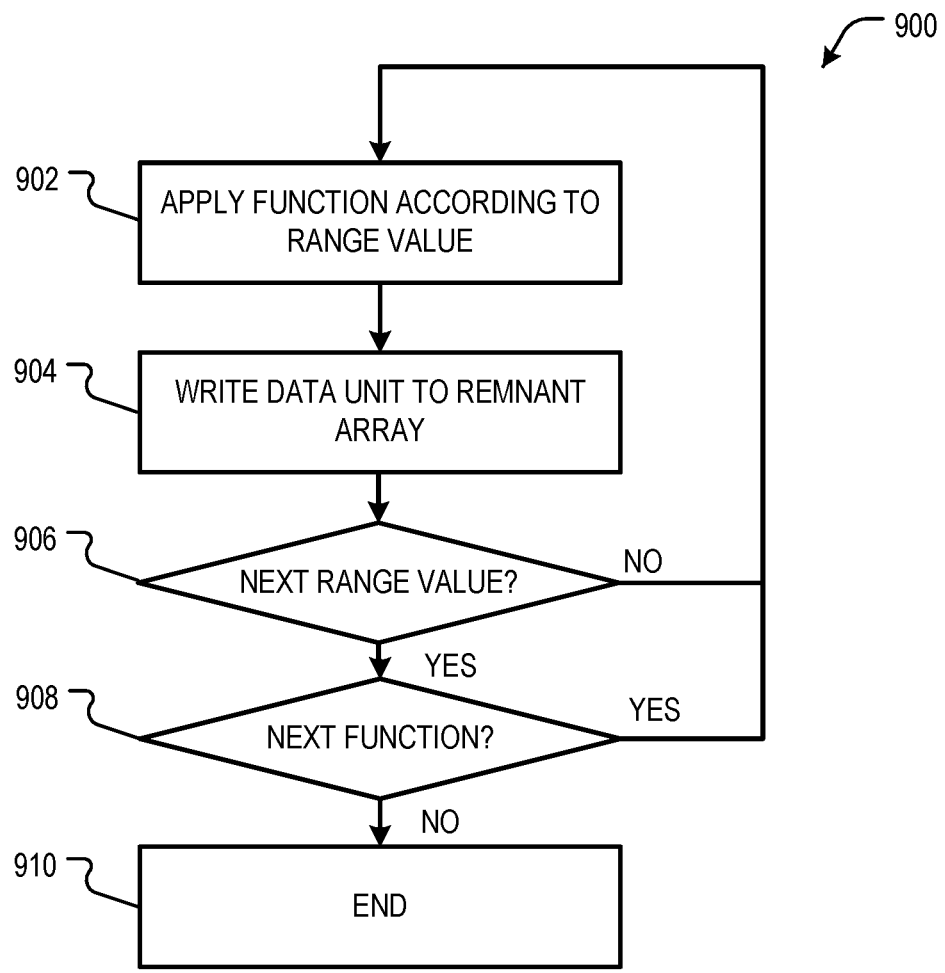
FIG. 9 is a flow chart showing one example of a process flow for reassembling a disassembled data structure, such as a data resource or an access object.

FIG. 9 is a flow chart showing one example of a process flow 900 for reassembling a disassembled data structure, such as a data resource or an access object. The process flow 900 may be executed by any suitable data assembler. In some examples, the data assembler is a combining routine of the first computing system or the second computing system.

At operation 902, the data assembler may apply a function to disassembled data and a remnant array according to a range value. The function may be selected, for example, by applying an ordered set of functions from assembly data in reverse order. For example, the first function applied to assemble the data structure may be the last function that was applied to disassemble it. Functions applied to assemble data may be applied utilizing the same function parameters that were utilized during disassembly. Values for the function range, however, may also be applied in reverse order. For example, the last range value for the function applied during disassembly may be the first range value for the function applied during assembly; the next-to-last range value for the function applied during disassembly may be the second range value for the function applied during disassembly, and so on. For example, if a circle function is applied during disassembly with a range of values in order from 0 to $2\pi$, the same range may be used during assembly in order from a to 0.

For each value in the function range, the function may produce a coordinate set. At operation 904, the data assembler may pull a next data unit from the disassembled data and write it to the determined location at the remnant array. Data units may be selected from the disassembled data in the reverse of the order in which they were written. For example, the last data unit written to the disassembled data may be the first written back to the remnant array, the next-to-last data unit written to the disassembled data 4 may be the second written back to the remnant array and so on. In this way, the assembler may reverse the operation of the disassembler by writing data units from the disassembled data back to their original location in the remnant array.

At operation 906, the data assembler may determine whether there is a next range value for the function. For example, the data assembler may determine whether it has already applied the complete range for the function. If not, then data assembler may return to operation 902 and apply the function according to the next range value. If all range values for the function have been applied, the data assembler may determine, at operation 908, whether there is a next function to be applied. For example, the data assembler may determine whether all of the functions applied during disassembly have been applied during assembly. If not, then the data assembler may iterate to the next function to be considered and return to operation 902 and apply the next function according to its next value range. For example, the data assembler may continue to proceed backwards through the ordered set of functions applied during disassembly. If no functions remain to be applied, then the remnant array may comprise all of the data from the original data structure (e.g., data resource or access object) in its original order. Accordingly, the process may end at operation 910.

Figure 10:
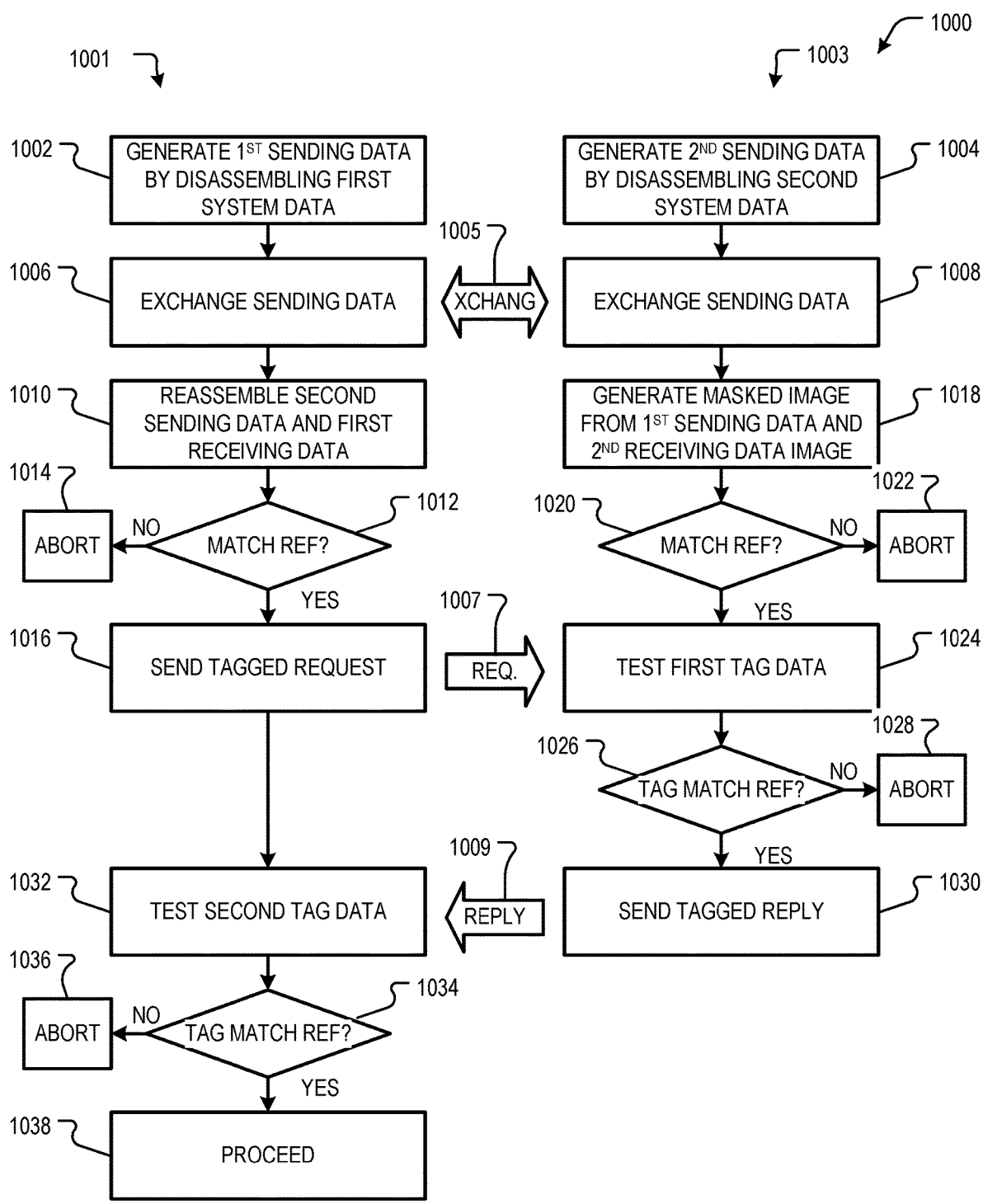
FIG. 10 is a flowchart showing one example of a process flow that may be executed by a first computing system and a second computing system to authenticate, for example, utilizing the example data disassembly/assembly techniques described in FIGS. 7-9.

FIG. 10 is a flowchart showing one example of a process flow 1000 that may be executed by a first computing system (such as 102) and a second computing system (such as 104) to authenticate, for example, utilizing the example data disassembly/assembly techniques described in FIGS. 7-9. FIG. 10 includes two columns 1001, 1003. Column 1001 includes actions performed by the first computing system while the column 1003 includes actions performed by the second computing system.

At optional operation 1002, the first computing system may generate its first sending data by disassembling encrypting first system data, for example, as described herein with reference to FIGS. 7 and 8. The first system data may be any suitable data, such as a user name, a password, biometric data, etc., or some combination thereof. Disassembly of the first system data may result in disassembled data and a remnant array. The first sending data may include all or part of the disassembled data and remnant array. In some examples, the first sending data includes part or all of the ordered list of functions for reassembling the first system data. At optional operation 1004, the second computing system may similarly generate its own second sending data, for example, by disassembling second system data. The second system data may also be, for example, a user name, a password, biometric data, etc. or some combination thereof. In some examples, operations 1002 and 1004 may be omitted. For example, the first and/or the second computing system may receive sending data from another source.

At operations 1006 and 1008, the first and second computing systems exchange sending data. For example, the systems may exchange one or more messages 1005 including sending data. At operation 1010, the first computing system may execute its combining routine to generate first composite data. This may include reassembling the second system data from the second sending data and the first receiving data. A combination of the second sending data and the first receiving data may include a disassembled data, a remnant array, and a first ordered list of functions. In some examples, the second sending data may include a first portion of the disassembled data, remnant array, and/or ordered list of functions while the first receiving data includes a second portion of the disassembled data, remnant array, and/or ordered list of functions. In another example, the second sending data includes the disassembled data and the remnant array and the first receiving data includes the ordered list of functions. In yet another example, the second sending data includes the disassembled data while the first receiving data includes the remnant data and the list of ordered functions. Any suitable arrangement may be used, however.

At operation 1012, the first computing system may execute its testing routine to verify the first composite data. In the example of FIG. 10, the testing routine may verify the first composite data by comparing the first composite data (e.g., the reassembled second system data) with first composite reference data. If the reassembled second system data is consistent with the first composite reference data, then the first composite data may be verified. If the first composite data is not verified, the first computing device may abort the process flow 1000 at operation 1014 (e.g., by not performing further operations with the second computing system). If the first composite data is verified, the first computing device may, at operation 1016, send a tagged request message 1007 to the second computing system. The tagged request message 1007 may include first tag data that is determined, by the tagging routine of the first computing system based at least in part on the first composite data. The first tag data may be based on the first composite data and may include, for example, all or part of the first composite data, a hash or other coding of the first composite data, a property or properties of the first composite data, etc.

Referring now back to the second computing system, at operation 1018, it may execute its combining routine to generate second composite data from the first sending data and second receive data. For example, the combining routine may reassemble the first system data from disassembled data, a remnant array, and an ordered list of functions that may be divided in any suitable way across the first sending data and the second receiving data, as described herein.

At operation 1020, the second computing system may execute its testing routine to verify the second composite data. This may include, for example, comparing the second composite data (e.g., the reassembled first system data) with second composite reference data. If the reassembled first system data is consistent with the second composite reference data, then the second composite data may be verified. If the second composite data is not verified, the second computing device may abort the process flow at operation 1022.

If the second composite data is verified, the second computing device may, at operation 1024, execute its tag test routine to test the first tag data. The tag test routine may also include determining, at operation 1026, if the first tag data is consistent with the second tag reference data. If the first tag data is not consistent with the second tag reference data, the second computing system may abort the authentication at operation 1028. If the first tag data is not consistent with the second tag reference data, then the second computing system may, at operation 1030, send a reply message 1009 to the first computing system. For example, the second computing system may generate second tag data by encrypting the clear first system data with the first system public key.

The first computing device may execute its tag test routine at operation 1032. If the second tag data is not consistent the first tag reference data at operation 1034, the first computing system may abort the authentication at operation 1036. If there is a match, the first computing system may proceed with its communication with the second computing system at operation 1038.

Figure 11:
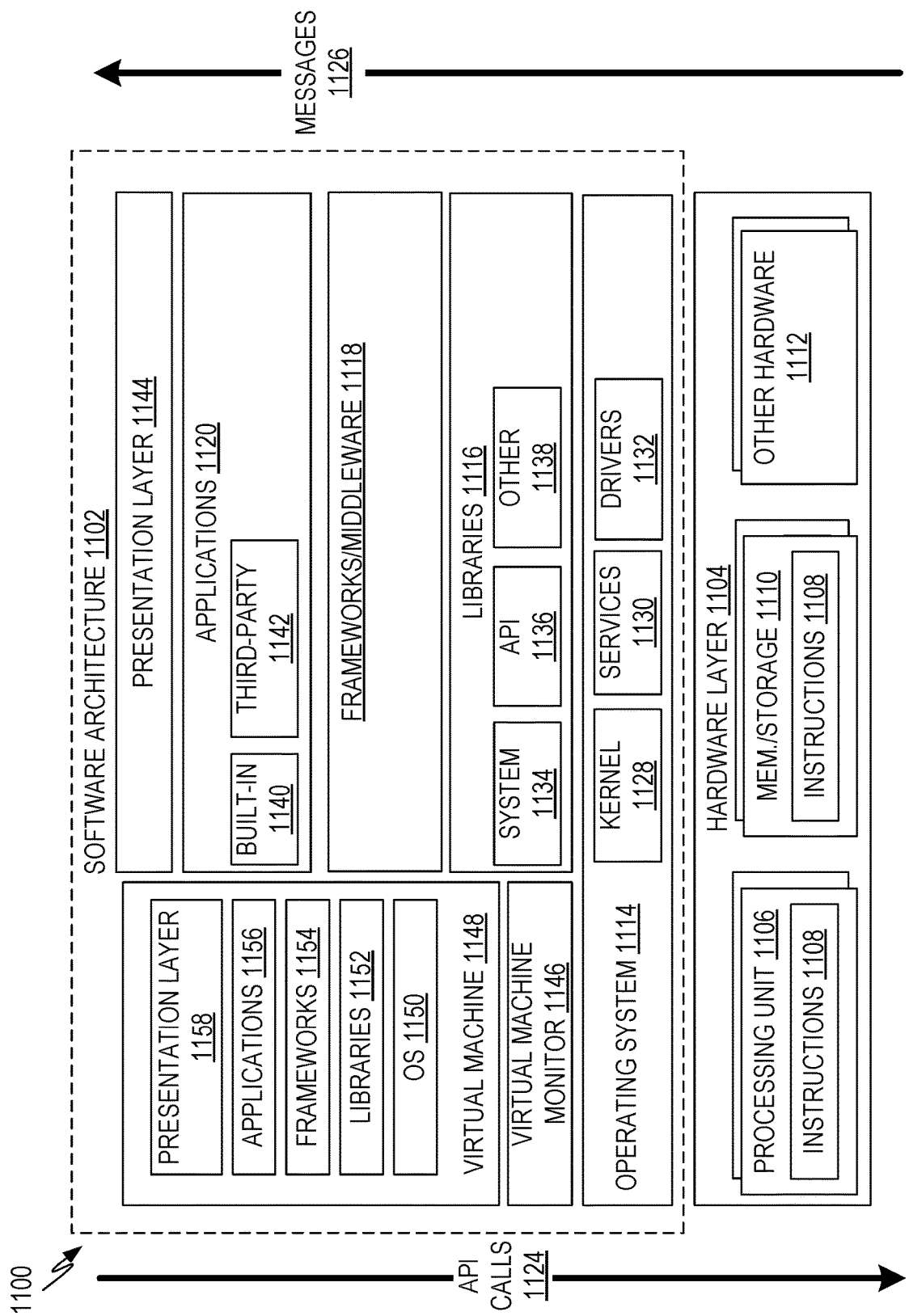
FIG. 11 is a block diagram showing one example of a software architecture for a computing device.

FIG. 11 is a block diagram 1100 showing one example of a software architecture 1102 for a computing device. The architecture 1102 maybe used in conjunction with various hardware architectures, for example, as described herein. For example, the architecture 1102 may describe the first computing system 102, the second computing system 104, the third computing system 190, the third party trust system 153, or components thereof. FIG. 11 is merely a non-limiting example of a software architecture and many other architectures may be implemented to facilitate the functionality described herein. A representative hardware layer 1104 is illustrated and may represent, for example, any of the above referenced computing devices. In some examples, the hardware layer 1104 may be implemented according to the architecture 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, components, and so forth of FIGS. 1-10. Hardware layer 1104 also includes memory and/or storage modules 1110, which also have executable instructions 1108. Hardware layer 1104 may also comprise other hardware 1112, which represents any other hardware of the hardware layer 1104, such as the other hardware illustrated as part of hardware architecture 1200.

In the example architecture of FIG. 11, the software 1102 may be conceptualized as a stack of layers where each layer provides particular functionality. For example, the software 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" may be separated from the aspects of the application/module that interact with a user.

Some software architectures utilize virtual machines. In the example of FIG. 11, this is illustrated by virtual machine 1148. A virtual machine creates a software environment where applications/modules may execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 may be the same as corresponding layers previously described or may be different.

Figure 12:
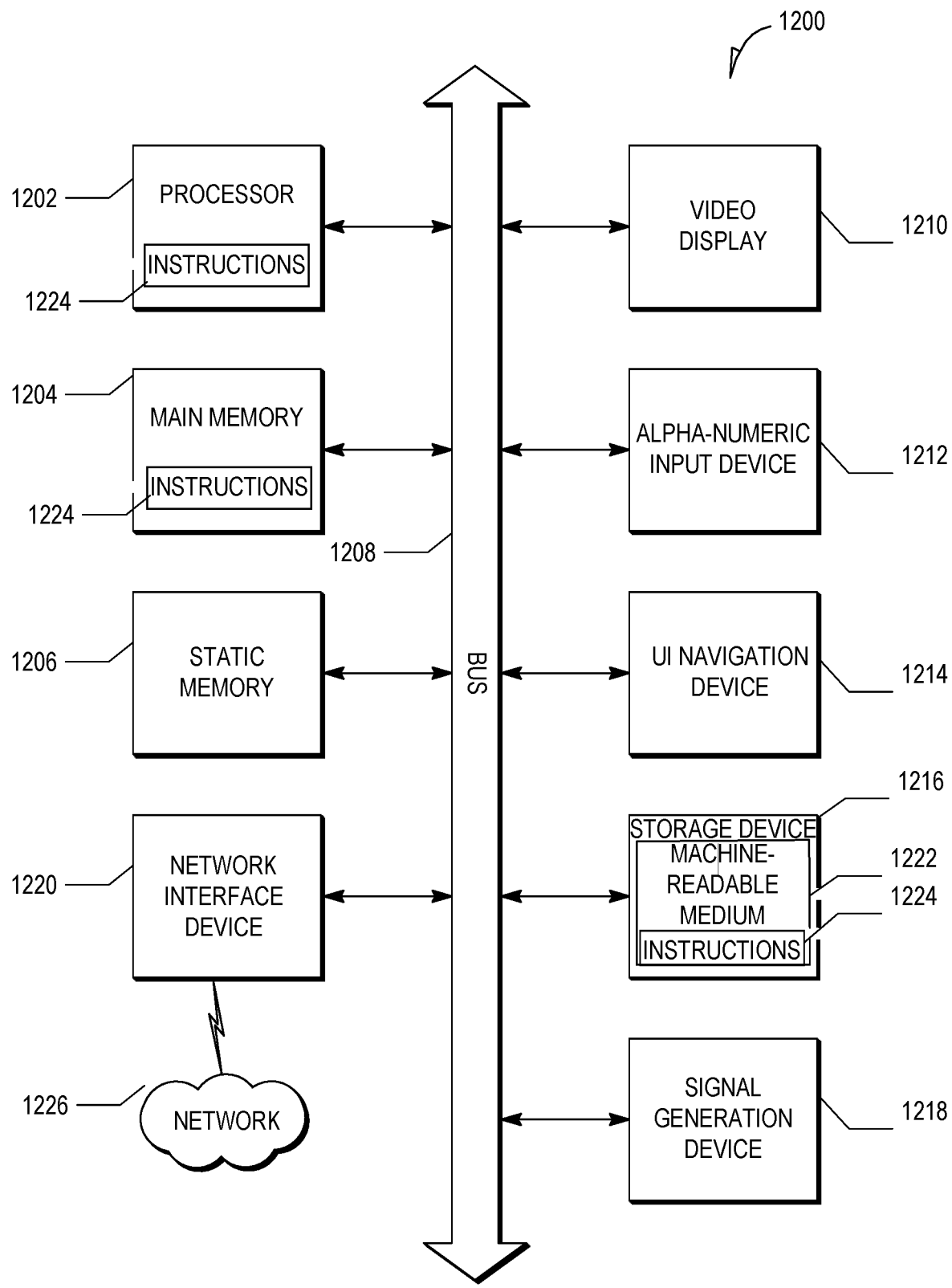
FIG. 12 is a block diagram illustrating a computing device hardware architecture, within which a set or sequence of instructions may be executed to cause the machine to perform examples of any one of the methodologies discussed herein.

FIG. 12 is a block diagram illustrating a computing device hardware architecture 1200, within which a set or sequence of instructions may be executed to cause the machine to perform examples of any one of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 may be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 may further include a video display unit 1210, an alphanumeric input device 1212 (e.g., a keyboard), and a user interface (UI) navigation device 1214 (e.g., a mouse). In some examples, the video display unit 1210, input device 1212 and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the architecture 1200, with the main memory 1204, static memory 1206, and the processor 1202 also constituting machine-readable media. Instructions stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner. In an example, circuits may be arranged (e.g., internally or with respect to external entities such as other circuits) in a specified manner as a circuit. In an example, the whole or part of one or more computing platforms (e.g., a standalone, client or server computing platform) or one or more hardware processors may be configured by firmware or software (e.g., instructions, an application portion, or an application) as a circuit that operates to perform specified operations. In an example, the software may reside on a machine-readable medium. In an example, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

ADDITIONAL NOTES & EXAMPLES

Example 1 is a system, comprising: a first computing system comprising a first processor unit in communication with a first data storage, wherein the first processor unit is programmed to perform operations comprising: executing a first combining routine to generate first composite data based at least in part on first system receiving data and at least in part on second system sending data received from a second computing system; executing a first testing routine to determine that the first composite data is consistent with first composite reference data; executing a first tagging routine to generate first tag data based at least in part on the first composite data; sending a request message comprising the first tag data to the second computing system; receiving from the second computing system, a reply message comprising second tag data; and executing a first tag test routine to determine that the second tag data is consistent with first system tag reference data.

In Example 2, the subject matter of Example 1 optionally includes wherein the first processor unit is further programmed to perform operations comprising: executing the first combining routine to generate additional composite data based at least in part on the first composite data and at least in part on additional first system receiving data; and executing the first testing routine to determine that the additional composite data is consistent with additional composite reference data, wherein the first tag data is also based at least in part on the additional composite data.

In Example 3, the subject matter of any one or more of Examples 1-2 optionally includes wherein the first processor unit is further programmed to perform operations comprising sending first system sending data to the second computing system.

In Example 4, the subject matter of any one or more of Examples 1-3 optionally includes wherein the first processor unit is further programmed to perform operations comprising: encrypting first system data with a second system public key to generate first system sending data; and sending the first system sending data to the second computing system.

In Example 5, the subject matter of any one or more of Examples 1-4 optionally includes wherein the first system receiving data comprises a first system private key, and wherein generating the first composite data comprises decrypting the second system sending data with the first system private key, wherein a result of the decrypting comprises the first composite data.

In Example 6, the subject matter of any one or more of Examples 1-5 optionally includes wherein the first system receiving data comprises first image data, wherein the second system sending data comprises second image data, and wherein generating the first composite data comprises generating a masked image based at least in part on the first image data and the second image data.

In Example 7, the subject matter of any one or more of Examples 1-6 optionally includes wherein the first system receiving data comprises disassembled data, wherein the second system sending data comprises a remnant array, and wherein generating the first composite data comprises assembling the disassembled data based at least in part on the remnant array.

In Example 8, the subject matter of any one or more of Examples 1-7 optionally includes wherein the first system receiving data comprises first partial disassembled data and a first portion of a remnant array, wherein the second system sending data comprises second partial disassembled data and a second portion of a remnant array, and wherein generating the first composite data comprises assembling the disassembled data based at least in part on the first partial disassembled data, the second partial disassembled data, the first portion of a remnant array, and the second portion of a remnant array.

In Example 9, the subject matter of any one or more of Examples 1-8 optionally includes the second computing system, wherein the second computing system comprises a second processor unit in communication with a second data storage, wherein the second processor unit is programmed to perform operations comprising: executing a second combining routine to generate second composite data based at least in part on second system receiving data and at least in part on first system sending data received from the first computing system; executing a second testing routine to determine that the second composite data is consistent with second composite reference data; receiving the request message from the first computing system; executing a second tag test routine to determine that the first tag data is consistent with second system tag reference data; and executing a second tagging routine to generate the second tag data based at least in part on the second composite data; and sending a reply message comprising the second tag data to the first computing system.

Example 10 is a method of authenticating a first computing system and a second computing system, the method comprising: receiving, by the first computing system, second system sending data from the second computing system; generating, by the first computing system, first composite data based at least in part on the second system sending data and first system receiving data; determining, by the first computing system, that the first composite data is consistent with first composite reference data; generating, by the first computing system, first tag data based at least in part on the first composite data; sending, by the first computing system and to the second computing system, a request message comprising the first tag data; receiving, by the first computing system and from the second computing system, a reply message comprising second tag data; and determining that the second tag data is consistent with reference tag data.

In Example 11, the subject matter of Example 10 optionally includes generating additional composite data based at least in part on the first composite data and at least in part on additional first system receiving data; and determining that the additional composite data is consistent with additional composite reference data, wherein the first tag data is also based at least in part on the additional composite data.

In Example 12, the subject matter of any one or more of Examples 10-11 optionally includes sending first system sending data by the first computing system and to the second computing system.

In Example 13, the subject matter of any one or more of Examples 10-12 optionally includes encrypting first system data with a second system public key to generate the first system sending data; and sending the first system sending data to the second computing system by the first computing system.

In Example 14, the subject matter of any one or more of Examples 10-13 optionally includes wherein the first system receiving data comprises a first system private key, and wherein generating the first composite data comprises decrypting the second system sending data with the first system private key, wherein a result of the decrypting comprises the first composite data.

In Example 15, the subject matter of any one or more of Examples 10-14 optionally includes wherein the first system receiving data comprises first image data, wherein the second system sending data comprises second image data, and wherein generating the first composite data comprises generating a masked image based at least in part on the first image data and the second image data.

In Example 16, the subject matter of any one or more of Examples 10-15 optionally includes wherein the first system receiving data comprises disassembled data, wherein the second system sending data comprises a remnant array, and wherein generating the first composite data comprises assembling the disassembled data based at least in part on the remnant array.

In Example 17, the subject matter of any one or more of Examples 10-16 optionally includes wherein the first system receiving data comprises first partial disassembled data and a first portion of a remnant array, wherein the second system sending data comprises second partial disassembled data and a second portion of a remnant array, and wherein generating the first composite data comprises assembling the disassembled data based at least in part on the first partial disassembled data, the second partial disassembled data, the first portion of a remnant array, and the second portion of a remnant array.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A system comprising:
a first computing system comprising a first processor unit in communication with a first data storage, wherein the first processor unit is programmed to perform operations comprising:
receiving second system sending data from a second computing system;
executing a first combining routine to combine first system receiving data stored at the first computing system with the second system sending data to generate first composite data, at least one of the second system sending data or the first system receiving data comprising assembly data that indicates a data structure, the executing of the first combining routine comprising combining at least a portion of the second system sending data and at least a portion of the first system receiving data into the data structure indicated by the assembly data to generate the first composite data;
executing a first testing routine upon the first composite data and first composite reference data stored at the first computing system, the first testing routine to determine that the first composite data is consistent with the first composite reference data, the executing of the first testing routine comprising determining that the first composite reference data is consistent with the first composite data;
executing a first tagging routine to generate first tag data using the first composite data;
sending a request message comprising the first tag data to the second computing system;
receiving from the second computing system, a reply message comprising second tag data;
executing a first tag test routine to determine that the second tag data is consistent with first system tag reference data stored at the first computing system;
executing the first tagging routine to generate third tag data using the first composite data, the third tag data being different than the first tag data; and
sending a third message comprising the third tag data to the second computing system.

2. The system of claim 1, wherein the first processor unit is further programmed to perform operations comprising:
executing the first combining routine to generate additional composite data at least in part by combining the first composite data and additional first system receiving data; and
executing the first testing routine to determine that the additional composite data is consistent with additional composite reference data, wherein the first tag data is also generated using the additional composite data.

3. The system of claim 1, wherein the first processor unit is further programmed to perform operations comprising sending first system sending data to the second computing system.

4. The system of claim 1, wherein the first system receiving data comprises first image data, wherein the second system sending data comprises second image data, and wherein combining the first system receiving data and the second system sending data comprises generating a masked image based at least in part on the first image data and the second image data.

5. The system of claim 1, wherein the first system receiving data comprises disassembled data, wherein the second system sending data comprises a remnant array, and wherein combining the first system receiving data and the second system sending data comprises assembling the disassembled data based at least in part on the remnant array.

6. The system of claim 5, wherein the first system receiving data comprises first partial disassembled data and a first portion of a remnant array, wherein the second system sending data comprises second partial disassembled data and a second portion of a remnant array, and wherein generating the first composite data comprises assembling the disassembled data based at least in part on the first partial disassembled data, the second partial disassembled data, the first portion of a remnant array; and the second portion of a remnant array.

7. The system of claim 1, further comprising:
the second computing system, wherein the second computing system comprises a second processor unit in communication with a second data storage, wherein the second processor unit is programmed to perform operations comprising:
receiving first system sending data from the first computing system;
executing a second combining routine to generate second composite data at least in part by combining second system receiving data stored at the second computing system and the first system sending data;
executing a second testing routine to determine that the second composite data is consistent with second composite reference data stored at the second computing system;
receiving the request message from the first computing system;
executing a second tag test routine to determine that the first tag data is consistent with second system tag reference data stored at the second computing system; and
executing a second tagging routine to generate the second tag data using the second composite data; and
sending the reply message comprising the second tag data to the first computing system.

8. A method of authenticating a first computing system and a second computing system, the method comprising:
receiving, by the first computing system, second system sending data from the second computing system;
executing, by the first computing system, a first combining routine to combine first system receiving data stored at the first computing system with the second system sending data to generate first composite data, at least one of the second system sending data or the first system receiving data comprising assembly data that indicates a data structure, the executing of the first combining routine comprising combining at least a portion of the second system sending data and at least a portion of the first system receiving data into the data structure indicated by the assembly data to generate the first composite data;

executing, by the first computing system, a first testing routine upon the first composite data and first composite reference data stored at the first computing system, the first testing routine to determine that the first composite data is consistent with the first composite reference data;

executing, by the first computing system, a first tagging routine to generate first tag data based at least in part on the first composite data;

sending, by the first computing system and to the second computing system, a request message comprising the first tag data;

receiving, by the first computing system and from the second computing system, a reply message comprising second tag data;

executing, by the first computing system, a first tag test routine to determine that the second tag data is consistent with reference tag data stored at the first computing system;

executing, by the first computing system, the first tagging routine to generate third tag data using the first composite data, the third tag data being different than the first tag data; and sending, by the first computing system, a third message comprising the third tag data to the second computing system.

9. The method of claim 8, further comprising:

generating additional composite data at least in part by combining the first composite data and additional first system receiving data; and determining that the additional composite data is consistent with additional composite reference data, wherein the first tag data is also generated using the additional composite data.

10. The method of claim 8, further comprising sending first system sending data by the first computing system and to the second computing system.

11. The method of claim 8, wherein the first system receiving data comprises first image data, wherein the second system sending data comprises second image data, and wherein combining the first system receiving data and the second system sending data comprises generating a masked image based at least in part on the first image data and the second image data.

12. The method of claim 8, wherein the first system receiving data comprises disassembled data, wherein the second system sending data comprises a remnant array, and wherein combining the first system receiving data and the second system sending data comprises assembling the disassembled data based at least in part on the remnant array.

13. The method of claim 12, wherein the first system receiving data comprises first partial disassembled data and a first portion of a remnant array, wherein the second system sending data comprises second partial disassembled data and a second portion of a remnant array, and wherein generating the first composite data comprises assembling the disassembled data based at least in part on the first partial disassembled data, the second partial disassembled data, the first portion of a remnant array, and the second portion of a remnant array.

14. A non-transitory machine-readable medium comprising instructions thereon that when executed by at least one processor unit cause the at least one processor unit to perform operations comprising:

receiving, by a first computing system, second system sending data from a second computing system;

executing, by the first computing system, a first combining routine to combine first system receiving data stored at the first computing system with the second system sending data to generate first composite data, at least one of the second system sending data or the first system receiving data comprising assembly data that indicates a data structure, the executing of the first combining routine comprising combining at least a portion of the second system sending data and at least a portion of the first system receiving data into the data structure indicated by the assembly data to generate the first composite data;

executing, by the first computing system, a first testing routine upon the first composite data and first composite reference data stored at the first computing system to determine that the first composite data is consistent with the first composite reference data, the first composite data not being transferred between the first computing system and the second computing system;

executing, by the first computing system, a first tagging routine to generate first tag data based at least in part on the first composite data and based at least in part on other data different than the first composite data;

sending, by the first computing system and to the second computing system, a request message comprising the first tag data;

receiving, by the first computing system and from the second computing system, a reply message comprising second tag data;

executing, by the first computing system, a first tag test routine to determine that the second tag data is consistent with reference tag data stored at the first computing system;

executing, by the first computing system, the first tagging routine to generate third tag data using the first composite data, the third tag data being different than the first tag data; and sending, by the first computing system, a third message comprising the third tag data to the second computing system.

15. The medium of claim 14, the operations further comprising:

generating additional composite data at least in part by combining the first composite data and additional first system receiving data; and determining that the additional composite data is consistent with additional composite reference data, wherein the first tag data is also generated using the additional composite data.

16. The medium of claim 14, the operations further comprising sending first system sending data by the first computing system and to the second computing system.

* * * * *

UNITED STATES PATENT AND TRADEMARK OFFICE
CERTIFICATE OF CORRECTION

PATENT NO. : 11,159,503 B2
APPLICATION NO. : 15/786113
DATED : October 26, 2021
INVENTOR(S) : Garfinkle et al.

Page 1 of 1

It is certified that error appears in the above-identified patent and that said Letters Patent is hereby corrected as shown below:

In the Claims

In Column 24, Line 27, in Claim 6, delete "array;" and insert --array,-- therefor Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*